(12) United States Patent
Trifol et al.

(10) Patent No.: US 11,530,771 B2
(45) Date of Patent: Dec. 20, 2022

(54) PLUG REMOVAL TOOL AND METHODS THEREOF

(71) Applicant: Schlumberger Technology Corporation, Sugar Land, TX (US)

(72) Inventors: Hugues Trifol, Clamart (FR); Matthieu Dezaphix, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 376 days.

(21) Appl. No.: 16/664,516

(22) Filed: Oct. 25, 2019

(65) Prior Publication Data

US 2020/0132240 A1   Apr. 30, 2020

Related U.S. Application Data

(60) Provisional application No. 62/751,182, filed on Oct. 26, 2018.

(51) Int. Cl.
*F16L 55/11* (2006.01)
*B23P 19/06* (2006.01)
*B25B 21/00* (2006.01)

(52) U.S. Cl.
CPC ......... *F16L 55/1108* (2013.01); *B23P 19/061* (2013.01); *B25B 21/002* (2013.01)

(58) Field of Classification Search
CPC .. B25B 21/002; B25B 23/0078; B23P 19/061; F16L 55/1108; F16L 55/1286
USPC ............................................ 220/323; 81/3.33
See application file for complete search history.

(56) References Cited

U.S. PATENT DOCUMENTS

| | | | | |
|---|---|---|---|---|
| 2,870,934 | A | * 1/1959 | Hill | F16L 55/1286 220/816 |
| 4,519,519 | A | * 5/1985 | Meuschke | G21F 7/005 220/291 |
| 2019/0023589 | A1 | * 1/2019 | Norman | C02F 1/46104 |
| 2020/0130017 | A1 | 4/2020 | Trifol et al. | |

* cited by examiner

*Primary Examiner* — Lee D Wilson
*Assistant Examiner* — Thomas Raymond Rodgers
(74) *Attorney, Agent, or Firm* — Trevor G. Grove

(57) ABSTRACT

A plug removal tool may include a mount for attaching the plug removal tool to a structure and a plug nut. Additionally, the plug removal tool may include at least one rigid arm extending between the mount and the plug nut. Further, the at least one arm may have at least one translational degree of movement and at least one rotational degree of movement.

17 Claims, 4 Drawing Sheets

PLUG REMOVAL TOOL AND METHODS THEREOF

CROSS-REFERENCE TO RELATED APPLICATIONS

This application claims priority to U.S. Provisional Patent Application No. 62/751,182 filed Oct. 26, 2018, which is herein incorporated by reference.

BACKGROUND

Field

Embodiments described herein generally relate to flow skids used in the oil & gas industry. Specifically, embodiments described herein relate to removal of a plug from such flow skids.

Description of the Related Art

Modular flow skids may be useful in the process of extracting and managing wells that are drilled into the earth to retrieve one or more subterranean natural resources, including oil and gas. Such skids may be utilized both offshore and onshore. For example, modular flow skids may be used for surface well testing to assess the reservoir potential, validate well performance during cleanup and commissioning, and to allow for reservoir monitoring for better field management. A modular flow skid is a structure having a set of pipes and components (i.e., fluid conduits) through which fluid (e.g., oil, gas, water, frac fluid, and testing fluids) may flow. In addition, the flow skid may include a number of flow control devices, including chokes, valves, and plugs, and may also include a number of instruments or devices for measuring and obtaining pertinent data about the fluid flowing through the one or more pipes located in the flow control modules. Further, the modular flow skid may include screens or filters inserted within the fluid conduits of the modular flow skid. Screens or filters are used to clean, filter, and remove debris from the fluid flowing through the fluid conduits.

During operations, the screens or filters are used to filter, clean, and remove debris from the fluid flowing through the fluid conduits. Subsequently, the screens or filters need to be cleaned, emptied, repaired and/or replaced from time to time. As known in the art, a filter may be a structure used to filter, clean, and remove debris from fluids flowing through fluid conduits. In order to clean, empty, and/or replace the filters, the fluid conduits are opened in order to access the filter. For example, the fluid conduit may have an opening, which is closed with a plug or insert, to access the filter within the fluid conduits. As illustrated in FIG. 1, in conventional methods, a plug 1, which is used to close an opening 2 of a flow conduit 3 of a modular flow skid 4, is taken off the opening 2 using a manual hook 5 attached to said plug 1 in combination with an overhead crane or pulley 6 to support a weight of the plug 1.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein provide a plug removal tool that has a mount for attaching the plug removal tool to a structure; a plug nut; and at least one rigid arm extending between the mount and the plug nut, the at least one arm having at least one translational degree of movement and at least one rotational degree of movement.

In another aspect, the embodiments disclosed herein provide a method for removing a filter in a fluid conduit by removing a plug nut from an opening of the fluid conduit; supporting the plug nut with a plug removal tool, thereby defining a limited movement of the plug nut while removed from the opening; and removing the filter through the opening of the fluid conduit.

In another aspect, the embodiments disclosed herein provide a system with a modular skid having a fluid conduit, wherein the fluid conduit has a fluid inlet and a fluid outlet; and at least one plug removal tool removably attached to the modular skid, wherein the plug removal tool includes a mounting bracket that comprises a first swivel joint, a first arm extending from a first end to a second end, wherein the first end is attached to the first swivel joint, a second arm slidably attached to the first arm between the first end and the second end, a second swivel joint connected to a distal end of the second arm, and a plug nut attached to the second swivel joint, wherein the plug removal tool is configured to remove or insert the plug nut from an opening of the fluid conduit.

Other aspects and advantages will be apparent from the following description and the appended claims

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
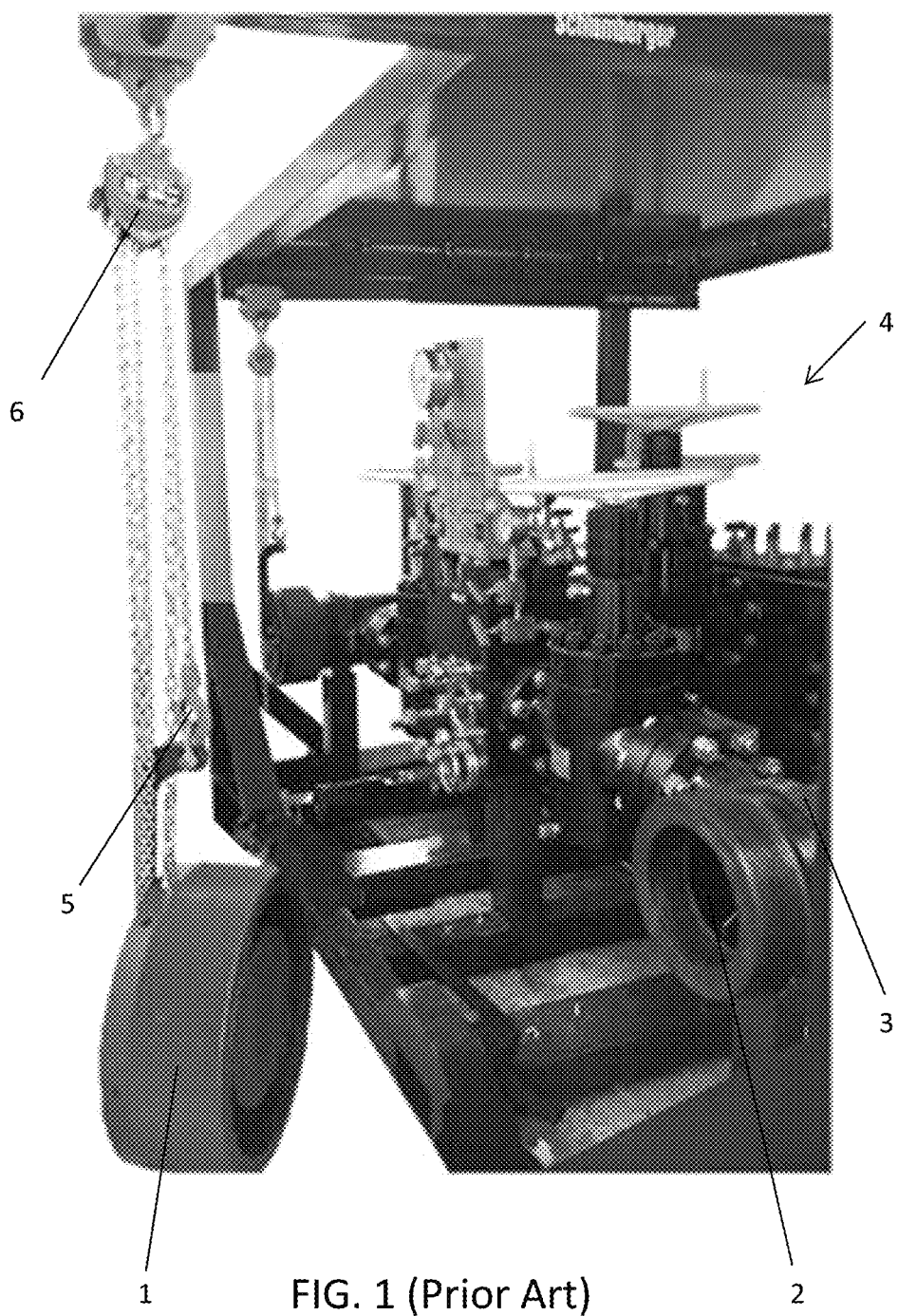
FIG. 1 is a perspective view of a plug removal system in accordance with the prior art.

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Further, embodiments disclosed herein are described with terms designating a drilling rig site in reference to a drilling rig, but any terms designating rig type (i.e., any land rig or offshore rig) should not be deemed to limit the scope of the disclosure. It is to be further understood that the various embodiments described herein may be used in various stages of a well, such as rig site preparation, drilling, completion, abandonment etc., and in other environments, such as workover rigs, fracking installation, well-testing installation, oil and gas production installation, without departing from the scope of the present disclosure. The embodiments are described merely as examples of useful applications, which are not limited to any specific details of the embodiments herein.

In one aspect, embodiments disclosed herein relate to a plug removal tool. A plug removal tool may also be interchangeably referred to as a plug support tool in the present disclosure. Similarly, a filter may be interchangeably referred to as a screen in the present disclosure. As used herein, the term "coupled" or "coupled to" or "connected" or "connected to" may indicate establishing either a direct or an indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

Plug removal tools, according to embodiments herein, are apparatuses that include a plurality of joints for moving a plug from or to an opening of a fluid conduit and at least one arm to aid in moving and supporting the plug when unplugged from the fluid conduct. It is envisioned that the plug removal tool may have at least one rigid arm to which the plug nut is attached, where the at least one rigid arm includes at least one rotational degree of movement and at least one translational degree of movement such that the plug nut may be moved away from the opening to remove a filter therefrom. However, the rigidity provided by the at least one arm eliminates the greater degrees of movement allowed by conventional mechanisms for removing the plug from the opening of the conduit. In addition, the plug removal tools may be run mechanically, hydraulically, or pneumatically. The elimination of manual hooks and the use of an overhead crane significantly reduce HSE risks, potentially equipment damage, and unwanted downtime. As described in FIG. 1, conventional methods of removing (or inserting) the plug 1 from the opening 2 of the flow conduit 3 within the modular flow skid 4 in the oil and gas industry are typically the manual hook 5 handled by a user (not shown). Further, the overhead crane or pulley 6 is needed to complete the extraction (or insertion) of the plug 1. Such conventional methods may be both time consuming and may also increase HSE risks. For example, in order to remove the plug 1, the user manually attaches the hook 5 to the plug 1 and rotates the plug 1 onto (or off) the opening 2 until enough of the plug 1 is free from the opening 2 such that the user may use the overhead crane 6 to support the plug 1. This additional manual hands-on method by the user adds to increasing the likelihood of HSE risk, spillage of fluids onto the rig floor, damage to equipment, and cause unwanted downtown. Accordingly, one or more embodiments in the present disclosure may be used to overcome such challenges as well as provide additional advantages over conventional methods of plug removal in oil and gas operations, as will be apparent to one of ordinary skill in the art upon reading this disclosure.

Figure 2:
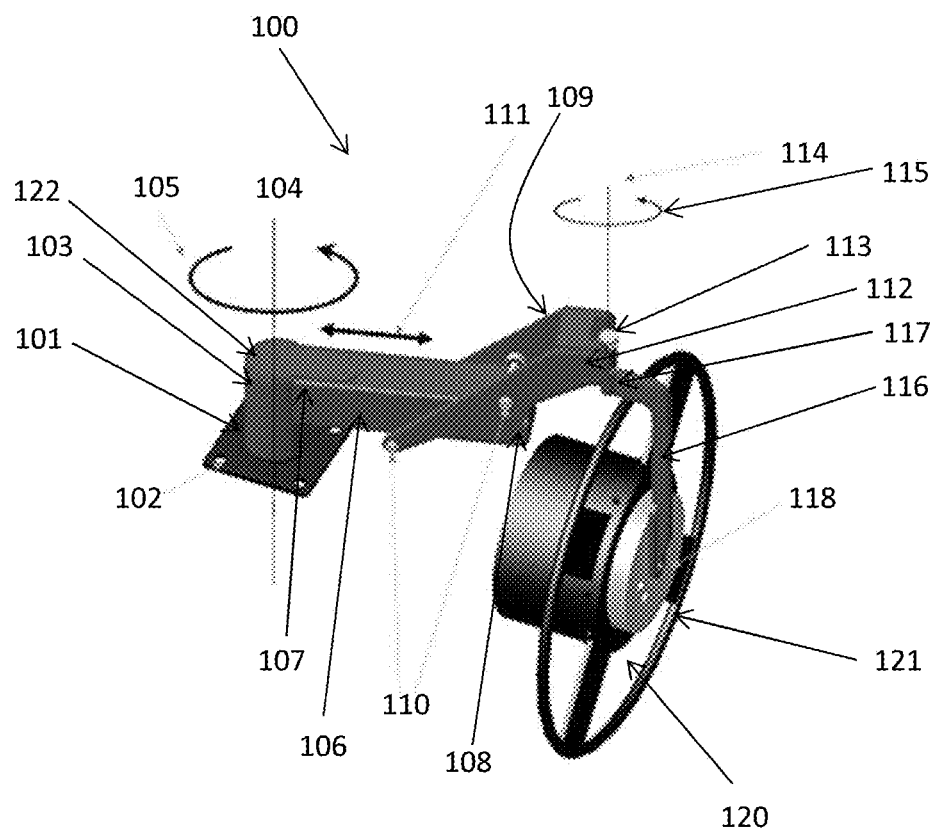
FIG. 2 is a perspective view of a plug removal tool in accordance with one or more embodiments of the present disclosure.

Turning to FIG. 2, FIG. 2 shows a perspective view of a plug removal tool 100 for removing/inserting and supporting a plug nut 120 in accordance with one or more embodiments of the present disclosure. As used herein, a plug nut, such as the plug nut 120, may include any structure that blocks a flow of fluids (which may include liquids, gases, and/or mixtures thereof) in a fluid conduit from flowing further and which may be secured in place to serve as such a blockage. In a non-limiting example, the plug nut 120 may include a thread such that the plug nut 120 may be unscrewed or screwed onto a body of the fluid conduit. The plug nut 120 is further described in FIGS. 5A and 5B and shown as including a plug component and a nut component. In one or more embodiments, the plug removal tool 100 may include a mounting bracket 101 or other mount for mounting the plug removal tool 100 onto a structure so that the weight of plug nut 120 may be supported by plug removal tool 100 (and in particular the mounting bracket 101. In a non-limiting example, the mounting bracket 101 may have mount holes 102 such that bolts (not shown) may bolt the mounting bracket 101 to a structure, such as a housing or exterior of a fluid conduit or to a frame component of a modular skid. As known in the art, a mounting bracket, such as the mounting bracket 101, may be any structure used to attach and support the plug removal tool 100 on a structure. It is noted that the mounting bracket 101 in one or more embodiments may be configured as a flat metal sheet or any shape that fits the plug removal tool 100 on a structure.

In one or more embodiments, the plug removal tool 100 may include a first swivel joint 103 fixed to the mounting bracket 101 about an axis of rotation 104. As illustrated, the first swivel joint 103 may rotate counter-clockwise (see arrow 105). While the first swivel joint 103 is shown rotating counter-clockwise, it may be understood that the first swivel joint 103 may rotate clockwise or both counter-clockwise and clockwise. In some embodiments, the first swivel joint 103 may include a pin (not shown) to fix the first swivel joint 103 from rotating and/or to limit a degree of rotation. In a non-limiting example, the first swivel joint 103 may rotate 360 degrees about the axis of rotation 104 and a pin may be inserted into the first swivel joint 103 such that the first swivel joint 103 rotates 90 degrees in a counter-clockwise direction. One skilled in the art will appreciate how the first swivel joint 103 may be any joint allowing a degree of rotation.

As illustrated in FIG. 2 (as well as some components in FIGS. 3 and 4 which are discussed in greater detail below), in one or more embodiments, a first arm 106 may be attached or fixed to the first swivel joint 103. In addition, a cover 122 may be used to further connect the first arm 106 to the first swivel joint 103. The first arm 106 extends from a first end 107 to a second end 108, such that the first end 107 is fixed to the first swivel joint 103 and the second end 108 is free. Further, as illustrated, a second arm 109 is slidably attached to the first arm 106 between the first end 107 and the second end 108. The second arm 109 may include bearings 110 to allow a sliding movement of the second arm 109 with respect to the first arm 106 (see arrow 111), perpendicular to the axis of rotation 104, both toward and away from swivel joint 103 and axis of rotation 104. While two bearings 110 are shown, it may be understood that any number of bearings may be used to slidably attach the second arm 109 to the first arm 106. It is further envisioned that the second arm 109 may include a lock to fix the second arm 109 in a position on the first arm 106. Additionally, the second arm 109 may be integrated into the first arm 106.

Still referring to FIG. 2, in one or more embodiments, at a distal end 112 of the second arm 109, second arm 109 may include a second swivel joint 113 connected thereon, such that the second swivel joint 113 may rotate about an axis of rotation 114 at the distal end 112. As illustrated, the second swivel joint 113 may rotate counter-clockwise (see arrow 115). While the second swivel joint 113 is shown rotating counter-clockwise, it may be understood that the second swivel joint 113 may rotate clockwise or both counter-clockwise and clockwise. I this case, the axis of rotation 104 is parallel to the axis of rotation 114. In some embodiments, the second swivel joint 113 may include a pin (not shown) to fix the second swivel joint 113 from rotating or limiting a degree of rotation. In a non-limiting example, the second swivel joint 113 may rotate 360 degrees about the axis of rotation 114 and a pin may be inserted into the second swivel joint 113 such that the second swivel joint 113 rotates in a limited degree range in a counter-clockwise direction. One skilled in the art will appreciate how the second swivel joint 113 may be any joint allowing a degree of rotation. Further, the second swivel joint 113 may aid in aligning the plug nut 120 with an opening of a fluid conduit such that the plug nut 120 is inserted into the opening straight.

Further illustrated by FIG. 2, in one or more embodiments, the plug nut 120 may be coupled to the second swivel joint 113. In a non-limiting example, a second mounting bracket 116 may be used to removably attach the plug nut 120 to the second swivel joint 113. The second mounting bracket 116 may be any apparatus, such as an L-shaped bracket, that includes a first end 117 attached to the second swivel joint 113 and a second end 118 bolted (directly or indirectly through another piece) to the plug nut 120. Furthermore, plug nut 120 may be rotated by a hand-wheel 121 Further, the plug nut 120 may be rotated mechanically or automatically. As the plug nut 120 is unscrewed, the second arm 109 may slide with respect to the opening to the fluid conduit, thereby translationally moving the position of the plug nut 120 with respect to the opening of a flow conduit. It is further envisioned that while FIG. 2 shows two arms and two swivel joints, the present disclose is not limited to such a configuration and may include any numbers of arms and swivel joints (and/or hoists) without departing from present scope of the disclose. For example, in a non-limiting example, the plug removal tool 100 may have one arm slidably attached to one swivel joint that allow for both rotating and sliding the plug nut 120.

Figure 3:
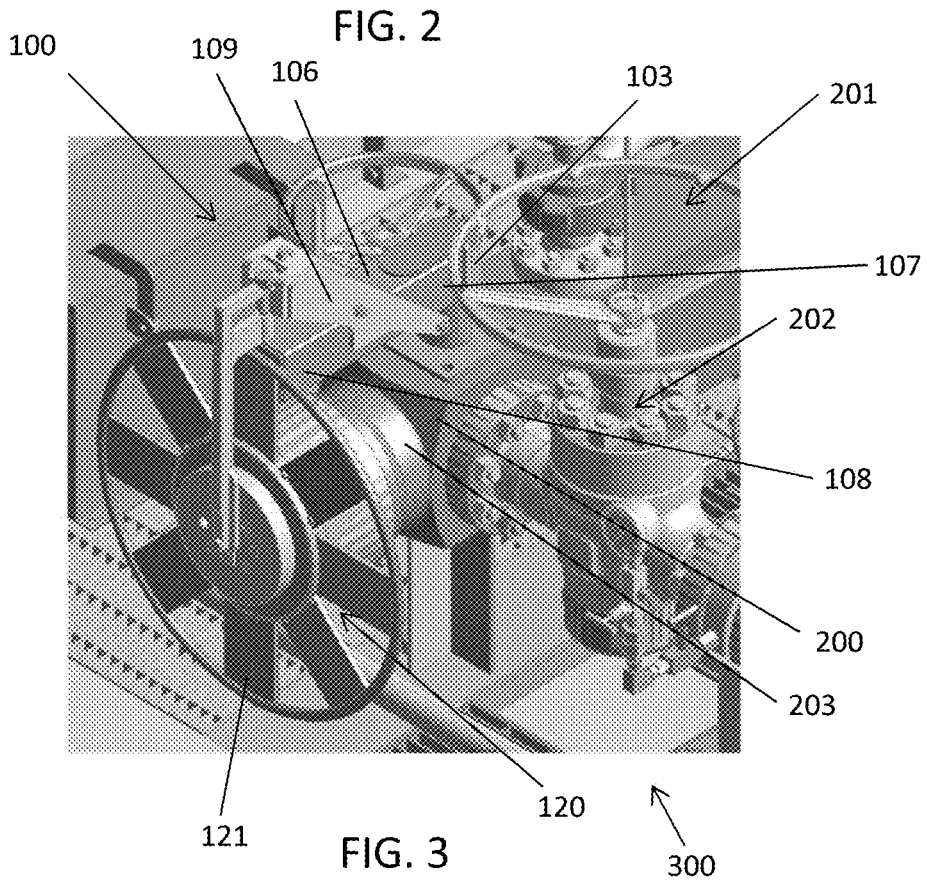
FIGS. 3 and 4 are a perspective view of a modular skid with the plug removal tool of FIG. 2 in accordance with one or more embodiments of the present disclosure.
Figure 4:
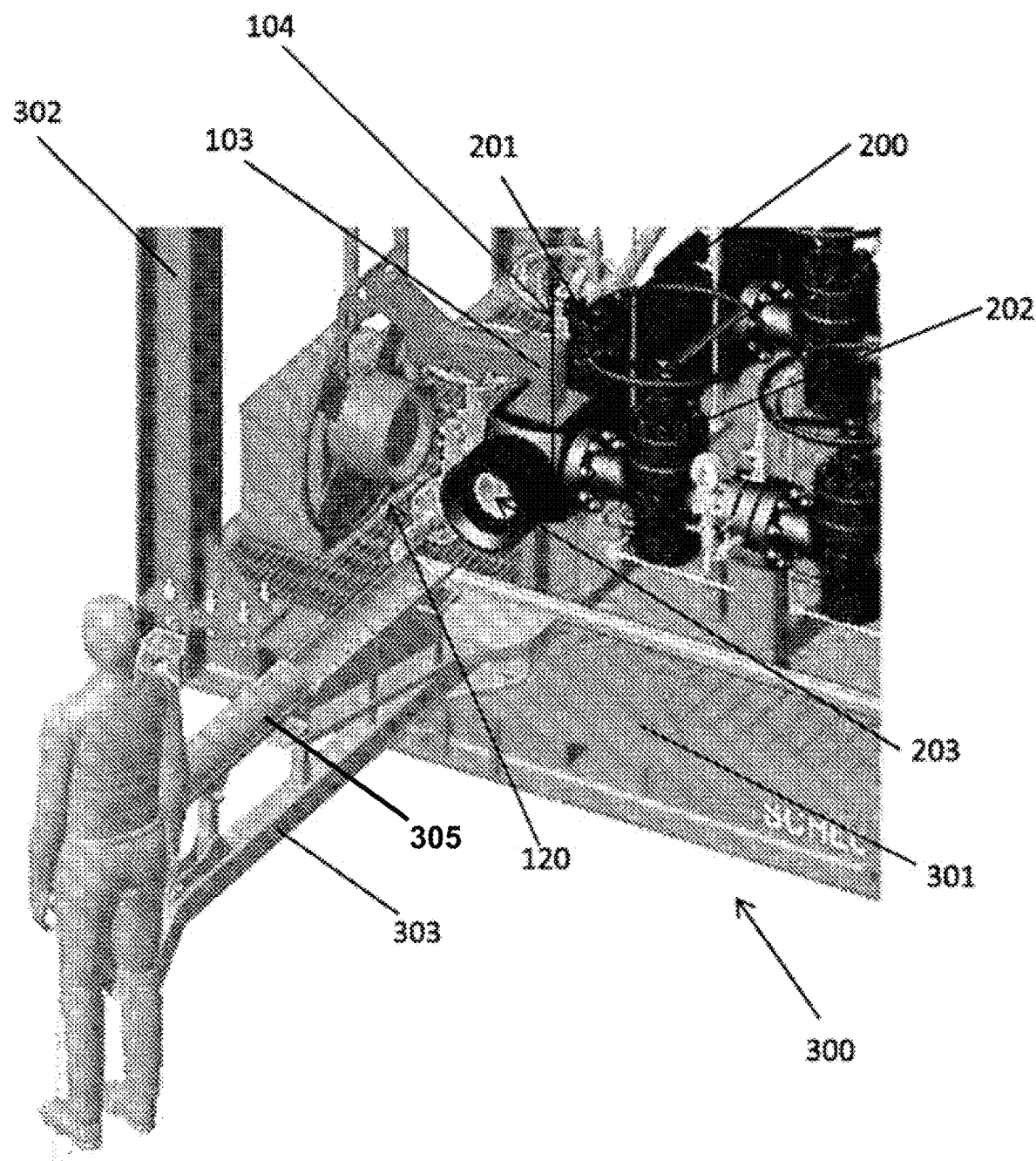

As seen by FIGS. 3 and 4, in one or more embodiments, the plug removal tool 100 (as described in FIG. 2) is attached to a body 200 having a fluid conduit 201, which may be a pot, on a modular skid 300. It is noted that FIG. 3 shows a close-up perspective view of the plug removal tool 100 on the modular skid 300 while the plug nut is attached to the opening of the fluid conduit, and FIG. 4 shows a zoomed-out perspective view of the plug removal tool 100 when the opening is open (the plug nut is detached from the opening). The modular skid 300 may be any type of modular skid used for fluid flows through a fluid conduit 201. In a non-limiting example, the modular skid 300 may be a plug and trash catcher skid. The plug and trash catcher skid may be used to help prevent plugging of chokes (on the skid) and/or other surface process equipment during drilling, well testing or fracturing frac flow back operations. Specifically, the plug and trash catcher skid has the capability of continuous debris removal without shutting down flow back or drilling operations. Further, the trash catcher (debris catcher) is designed to catch and retain chunks from drilled plugs, for example. Said trash catchers are very effective to prevent erosion damage to downstream equipment and catch and retain debris, chunks and trash, drilled bridge plugs etc. Advantageously, the plug and trash catcher skid may aid in: removal and cleanup on horizontal-multilateral completion and workover; drill out of completion tools such as bridge plugs, selective frac packer system; capture of frac sand and formation solids; and/or work over use to capture drill out solids, such as cement retainer, bride plug, cement and formation solids frac sand, and fishing operation solids.

In one or more embodiments, the modular skid 300 may include isolation valves 202 coupled to the fluid conduit 201. The fluid conduit 201, in this case a pot, holds the filter (not shown). In some embodiments, the isolation valves 202 are used to direct fluid from a fluid conduit of the modular skid 300 to the fluid conduit 201 where the filters are in fluid communications with the fluid conduit and are configured to filter a fluid flowing through the fluid conduit. While only one fluid conduit 201 is shown, the present disclose is not limited to such a configuration and may include any numbers of pots without departing from present scope of the disclosure. In a non-limiting example, the isolations valves 202 allow for fluid flow to only go through one fluid conduit at a time, both fluid conduits, or none of the fluid conduits. Further, each fluid conduit 201 includes an opening 203 at an end of the body 200. In combination with the plug nut 120, when the fluid conduit 201 is a pot, the plug 201 forms a pot plug (201, 120) to enclose the filter (not shown).

As further shown by FIGS. 3 and 4, the plug removal tool 100 is mounted to the body 200 of the fluid conduit 201, in this case on top of the fluid conduit 201, to have the plug removal tool 100 near the opening 203. While the plug removal tool 100 is shown mounted on the body 200, one skilled in the art will appreciate how the plug removal tool 100 may be mounted on any part of the modular skid 300 such as a structural frame or a component of the skid, without departing from present scope of the disclose. In a non-limiting example, the plug removal tool 100 may be mounted on a base 301 or a support beam 302 of the modular skid 300. In some embodiments, it is further envisioned that the plug removal tool 100 may be mounted on a filter extractor tool 303. In one or more embodiments, the filter extractor tool 303 is mounted on the base 301 to align the filter extractor tool 303 with the pot plug (201, 120). One skilled in the art will appreciate how the filter extractor tool 303 is coupled to the base 301 to be removable or fixed via mechanical fasteners, welding, adhesives, or any known way in the art. It is further envisioned that while FIG. 4 illustrates the filter extractor tool 303 coupled to the base 301, the filter extractor tool 303 may be coupled to any part of the modular skid 300. In some embodiments, the filter extractor tool 303 may remain unattached to the modular skid 300 and be disposed on a surface near the pot plug (201, 120). Once filter extractor tool 303 is aligned with the fluid conduit 201, the plug nut 120 may be removed such that the filter extractor tool 303 is used to remove and clean the filter within the fluid conduit 201. Additionally, while the filter is being cleaned, a spare filter may be inserted into the fluid conduit 201 to ensure operations continue without delay. Such filter extractor tools may include those described in a contemporaneously filed application entitled "Filter Extracting Tool and Methods Thereof" Ser. No. 62/751,252, which is herein incorporated by reference in its entirety.

As described above, in one or more embodiments, FIG. 3 shows the close-up perspective view of the plug removal tool 100 with the plug nut 120 closed on the opening 203. In order for the plug nut 120 to be sealingly closed on the opening 203, the second arm 109 has slid in axial direction on the first arm 106 to be at a position in which the second arm 109 is closest to the first end 107 of the first arm 106. It is further envisioned that the second end 108 of the first arm 106 may act as a stop for the hand-wheel 121 to abut against.

Furthermore, as described above, FIG. 4 shows a zoomed-out perspective view of the plug nut 120 removed from the opening 203 by the plug removal tool 100. As illustrated by FIG. 4, in one or more embodiments, the plug removal tool 100 may be rotated 90 degrees (or any other desired degree) about the axis of rotation 104 of the first swivel joint 103 such that the plug nut 120 is in a non-operation position such that it no longer interferes with or blocks the opening 203 of the pot 207. Additionally, the first swivel joint 103 may then be locked to ensure that the plug removal tool 100 does not sway. While it is shown that the plug removal tool 100 is rotated 90 degrees, one skilled in the art will appreciate how the plug removal tool 100 may move any degree needed to have the opening 203 be accessible. With the plug nut 120 rotated away from the opening 203, the filter extractor tool 303 may now be used to remove the filter 305 from the fluid conduit 201.

Figure 5A:
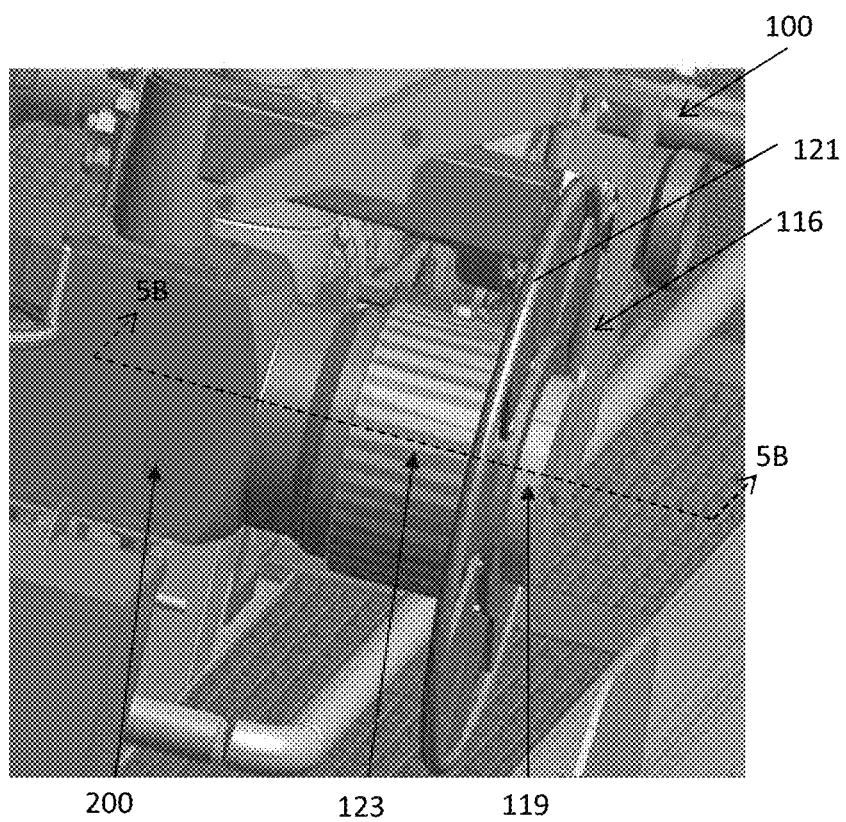
FIG. 5A is a side view of the plug removal tool of FIG. 3 in accordance with one or more embodiments of the present disclosure.
Figure 5B:
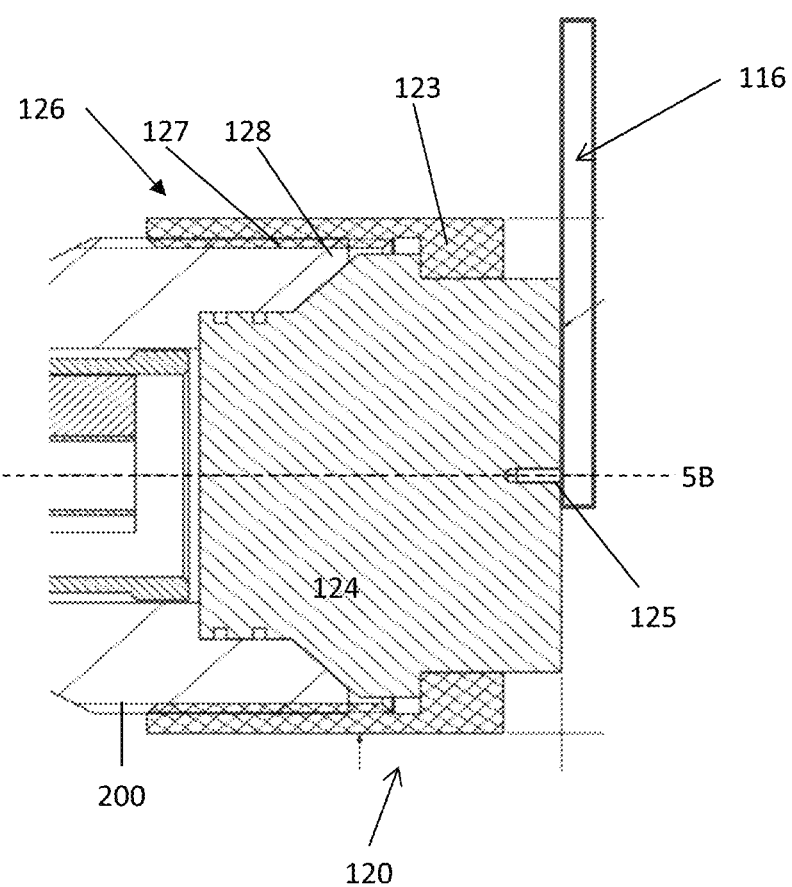
FIG. 5B is a cross-sectional view along line 5B-5B in FIG. 5A in accordance with one or more embodiments of the present disclosure.

As shown in FIGS. 5A and 5B, in one or more embodiments, the plug nut 120 may be a combination of a nut 123 and a plug 124, which are slidable relative to each other. When plug 124 is inserted into a body 200, nut 123 slides over the distal end of plug 124 and retains plug 124 within body by threading onto body. Specifically, the nut 123 is coupled to the body 200 via a threaded connection 126 such that an inner surface 127 of the nut 123 may include threads to be threaded on threads of an outer surface 128 of the body 200. Nut 123 may be screwed onto body 200 by rotating hand-wheel 121 attached to nut 123. As nut 123 is tightened onto body 200, a shoulder of nut 123 may abut a shoulder of plug 124, thereby retaining plug 124 within body 200 (and sealing body 200 from the external environment). In some embodiments, a bolted connection 125 connects the second mounting bracket 116 to the plug 124, thereby. When nut 123 is rotated via hand-wheel 121, plug 124 and the second mounting bracket 116 remain stationary. In a non-limiting example, bearings (not shown) may be inserted between the nut 123 and the plug 124 to allow the nut 123 to rotate over the plug 124. In another non-limiting example, a sufficient clearance may be provided between nut 123 and plug 124 to allow the nut 123 to rotate over plug 124. As nut 123 is unscrewed away from body 200, plug 124 may be removed from body 200 via its attachment to mounting bracket 116.

Furthermore, methods of the present disclosure may include use of the filter extractor tool and other structures, such as in FIGS. 2-5B. Because the method may apply to any of the embodiments, reference numbers are not referenced to avoid confusion of the numbering between the different embodiments.

Initially, a plug removal tool is coupled to a body of a fluid conduit to be near an opening of the fluid conduit in a modular skid. In a non-limiting example, a mount bracket of the plug removal tool is bolted onto the body. Once the plug removal tool is attached to the body, a plug nut is then connected to an arm of the plug removal tool via a second mounting bracket so that the plug removal tool may support a weight of the plug nut. The second mounting bracket is coupled to the plug nut and a swivel joint of the arm. Next, the arm is slid in an axial direction on a second arm to position the plug nut in front of an opening of the body. (the opening being in fluid communication with the fluid conduit). Further, at least one swivel joint of the arm is used to align the plug nut with the opening. Once straightly aligned, a hand-wheel coupled to the plug nut is rotated to screw the plug nut onto the opening and sealingly close the opening to ensure no fluids flowing through the fluid conduit leak. Further, the plug nut is screwed onto the body via threads on a nut of the plug nut being threaded onto threads of the body as the hand-wheel is rotated. Additionally, while nut is being threaded onto the body, a plug attached to the nut is sealingly inserted into the opening. Further, while the plug nut is thread onto the opening, the arm may in to correspond with any translational movement of the plug nut while being screwed. As fluids flow through the fluid conduit, the fluids travel through a filter disposed in the fluid conduit to filter debris from the fluid. Eventually, the filter may need to be removed for maintenance. In order to perform maintenance on the filter, the filter may be removed from the fluid conduit through the opening; however, the plug nut will need be removed first.

In order to remove the plug nut (and filter), the hand-wheel is rotated to unscrew the plug nut from the opening such that the threads of the nut are unthreaded from the threads of the body and correspondingly, the plug is removed out of the opening. As the plug nut is unscrewed, the arm may axially move in a direction corresponding to the axial movement of the plug nut unscrewing. Once the plug nut is fully unscrewed from the opening, the plug nut removal tool supports all of the weight of the plug nut. In order to move the plug nut away from the opening, the plug nut may be rotated by at least one degree of movement away from the opening (including translational movement and/or rotational movement. For example, the first and/or second arm of the plug nut tool may be rotated about an axis of rotation of the swivel joint(s), thereby rotating or pivoting the plug nut away from the opening. For example, the plug nut may be rotated 90 degrees from the opening to be in a non-operation position and then the swivel joint may be locked to keep the plug nut from swaying. While 90 degrees is used, the degree of rotation is not limited to 90 degrees and may be any degree necessary to clear the opening without departing from the scope of the present disclosure. With the plug nut removed from the opening, the filter may be removed from the fluid conduit through the opening. In some embodiments, a filter extracting tool may be used to extract the filter through the opening. Once the filter is removed, a spare or new filter may be inserting into the fluid conduit through the opening. With the spare or new filter set in the fluid conduit, the swivel joint of the second arm may be unlocked so that the second arm may rotate back to position the plug nut in front of the opening. Then the swivel joint of the arm and a swivel joint of the second arm are used to re-align the plug nut with the opening to then rotate the hand-wheel to screw the plug nut back into the opening. With the plug nut sealingly closing the opening, fluids may flow through the spare or new filter without leaks from the opening.

While the foregoing is directed to embodiments of the present invention, other and further embodiments of the present disclosure may be devised without departing from the basic scope thereof, and the scope thereof is determined by the claims that follow.

What is claimed is:

1. A plug removal tool, comprising:
a first mount for attaching the plug removal tool to a structure;
a second mount for removably attaching the plug removal tool to a plug in an opening of a conduit, the plug secured by a plug nut that comprises a hand-wheel for rotation of the plug nut with respect to threads of the conduit;
a first rigid arm rotatable about the first mount and a second rigid arm disposed at a fixed angle and translatable with respect to the first rigid arm; and
at least one bearing, defining a bearing axis that traverses the first rigid arm, configured to allow a sliding movement of the second rigid arm with respect to the first rigid arm, wherein the first and second rigid arms extend between the first mount and the second mount, wherein a mounting bracket of the second mount extends from the second rigid arm above and downwardly in front of the hand-wheel, and wherein the first and second rigid arms are responsive to a force applied to the hand-wheel, transitioning the plug removal tool between an operation position aligned with the opening of the conduit and a non-operation position for access to the opening of the conduit.

2. The plug removal tool of claim 1, wherein:
the first mount comprises a mounting bracket that comprises a first swivel joint;
the first rigid arm extends from a first end to a second end, wherein the first end is attached to the first swivel joint;
the second rigid arm slidably attaches to the first rigid arm between the first end and the second end; and
a second swivel joint connected to a distal end of the second rigid arm and attached to the second mount.

3. The plug removal tool of claim 1, wherein a second swivel joint has an axis of rotation about which the mounting bracket rotates.

4. The plug removal tool of claim 2, wherein the first swivel joint has an axis of rotation about which the first rigid arm rotates.

5. The plug removal tool of claim 4, wherein the second swivel joint has an axis of rotation, parallel to the axis of rotation of the first swivel joint, about which the mounting bracket rotates.

6. A method for removing a filter in a fluid conduit, comprising:
utilizing a plug removal tool that comprises a first mount for attaching the plug removal tool to a structure, a second mount for removably attaching the plug removal tool to a plug in an opening of a fluid conduit, the plug secured by a plug nut that comprises a hand-wheel for rotation of the plug nut with respect to threads of the fluid conduit, a first rigid arm rotatable about the first mount and a second rigid arm disposed at a fixed angle and translatable with respect to the first rigid arm, and at least one bearing, defining a bearing axis that traverses the first rigid arm, configured to allow a sliding movement of the second rigid arm with respect to the first rigid arm, wherein the first and second rigid arms extend between the first mount and the second mount, wherein a mounting bracket of the second mount extends from the second rigid arm above and downwardly in front of the hand-wheel and wherein the first and second rigid arms are responsive to a force applied to the hand-wheel, transitioning the plug removal tool between an operation position aligned with the opening of the fluid conduit and a non-operation position for access to the opening of the fluid conduit, removing the plug nut from the opening of the fluid conduit;
supporting the plug nut with the plug removal tool, thereby defining a limited movement of the plug nut while removed from the opening; and
removing the filter through the opening of the fluid conduit.

7. The method of claim 6, wherein the removing of the plug nut comprises rotating the hand-wheel attached to the plug nut to unscrew the plug nut from the opening.

8. The method of claim 7, further comprising sliding the second rigid arm of the plug removal tool to correspond with an axial movement of the plug nut.

9. The method of claim 6, further comprising rotating the plug removal tool to have the plug nut in non-operation position.

10. The method of claim 7, wherein the rotating of the plug removal tool comprises rotating about an axis of rotation of a swivel joint.

11. The method of claim 7, further comprising rotating the plug nut 90 degrees from the opening.

12. A system, comprising:
a modular skid having a fluid conduit, wherein the fluid conduit has a fluid inlet and a fluid outlet; and
at least one plug removal tool removably attached to the modular skid, wherein the plug removal tool comprises:
a first mounting bracket that comprises a first swivel joint;
a first arm extending from a first end to a second end, wherein the first end is attached to the first swivel joint;
a second arm slidably attached to the first arm between the first end and the second end and disposed at a fixed angle with respect to the first arm;
at least one bearing, defining a bearing axis that traverses the first arm, configured to allow a sliding movement of the second arm with respect to the first arm;
a second swivel joint connected to a distal end of the second arm; and
a second mounting bracket for removably attaching the plug removal tool to a plug, attached to the second swivel joint,
wherein the plug removal tool is configured to remove or insert the plug nut from an opening of the fluid conduit via a plug nut that comprises a hand-wheel for rotation of the plug nut with respect to threads of the fluid conduit, and wherein the second mounting bracket extends from the second arm above and downwardly in front of the hand-wheel for attachment of the plug removal tool to the plug.

13. The system of claim 12, further comprising at least one filter in fluid communication with the fluid conduit, wherein the filter is configured to filter a fluid flowing through the fluid conduit, and wherein the filter is accessed through the opening of the fluid conduit.

14. The system of claim 13, wherein the modular skid is a plug and trash catcher skid and the filter is disposed in a pot attached to the fluid conduit, wherein the opening is at an end of the pot.

15. The system of claim 14, wherein the plug removal tool is mounted on top of the pot.

16. The system of claim 12, further comprising at least one filter extractor removably attached to the modular skid, wherein the filter extractor is configured to remove a filter when the plug removal tool has removed the plug nut from the opening.

17. The system of claim 12, wherein the first and second swivel joints have parallel axes of rotation.

* * * * *